Sept. 15, 1953 P. C. DUVAL 2,652,480
COMBINED ILLUMINATOR AND REFLECTOR
Filed June 17, 1948 4 Sheets-Sheet 1
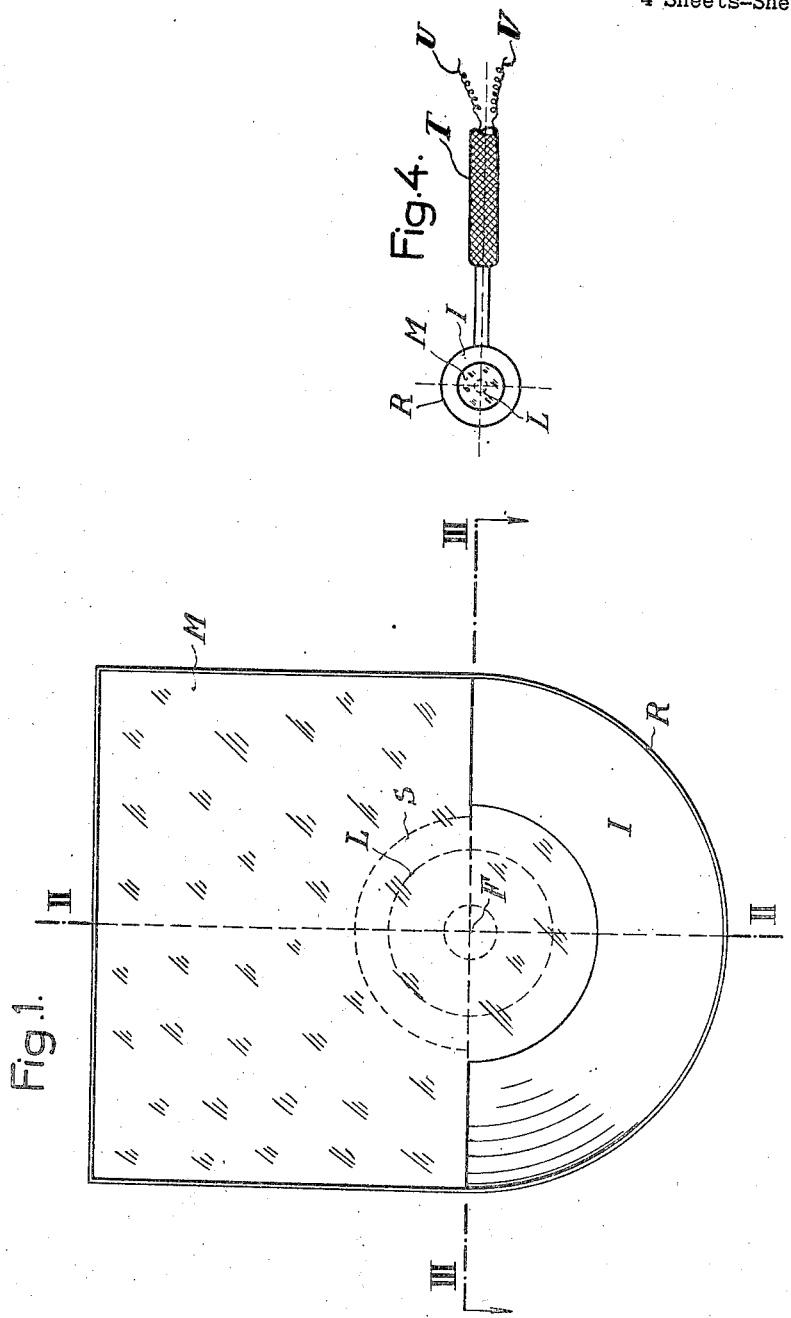
Inventor
Philippe Charles Duval
By Robert E. Burns
Attorney

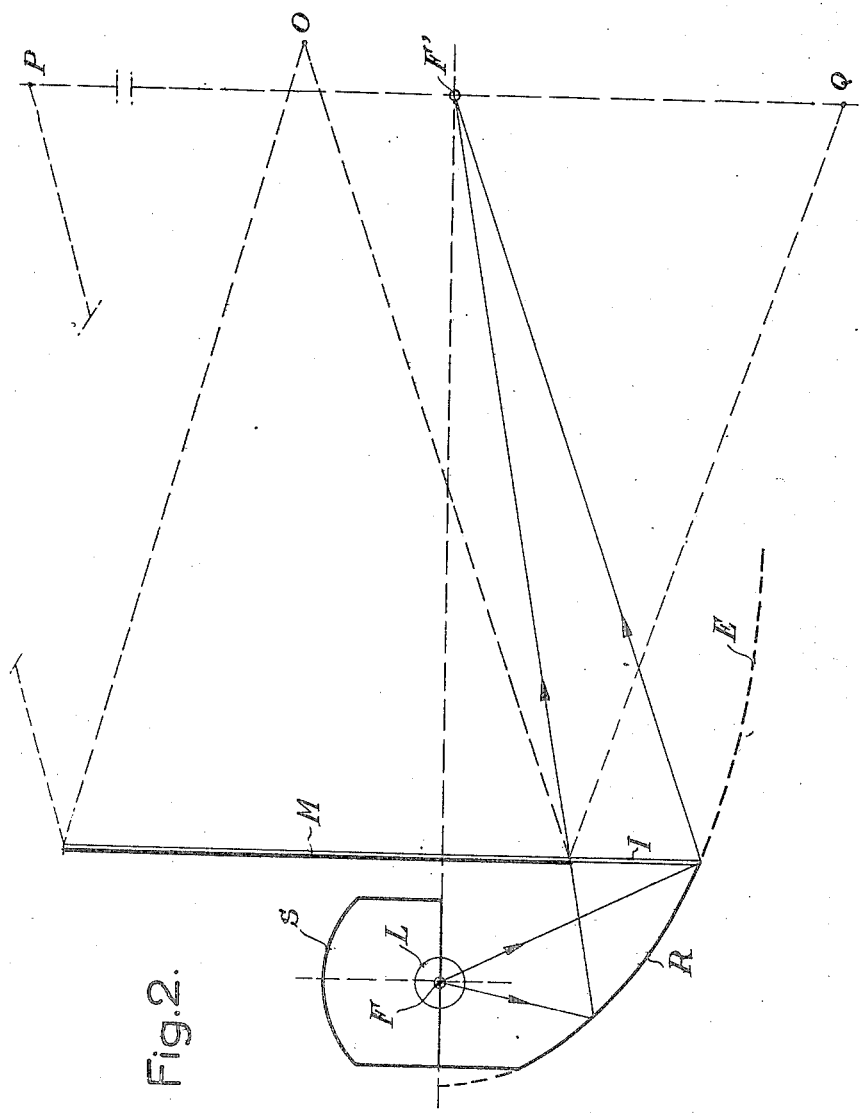

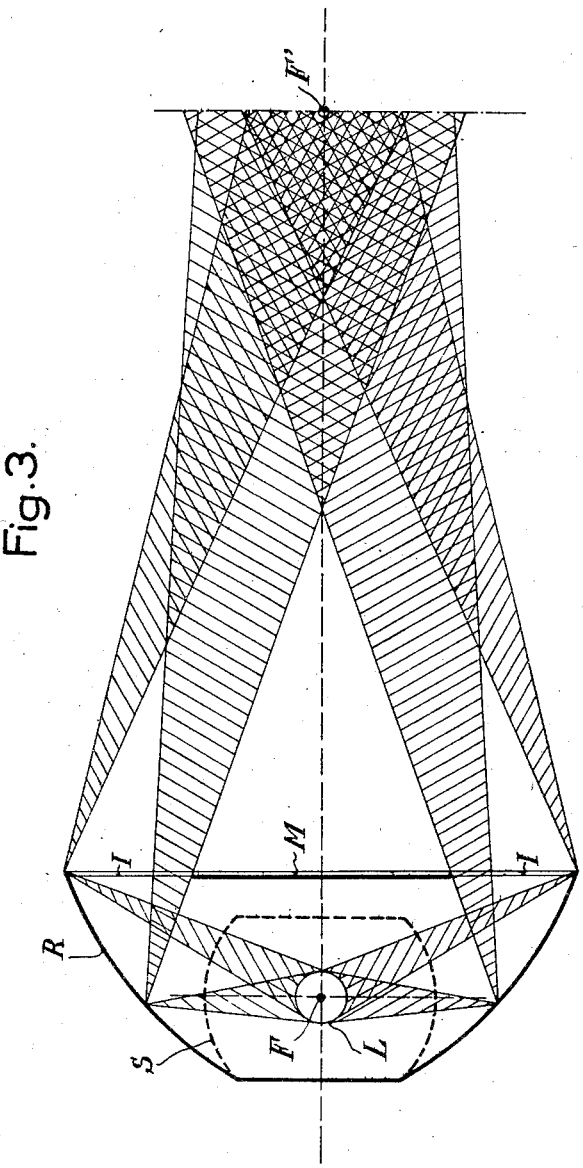

Sept. 15, 1953 P. C. DUVAL 2,652,480
COMBINED ILLUMINATOR AND REFLECTOR
Filed June 17, 1948 4 Sheets-Sheet 4
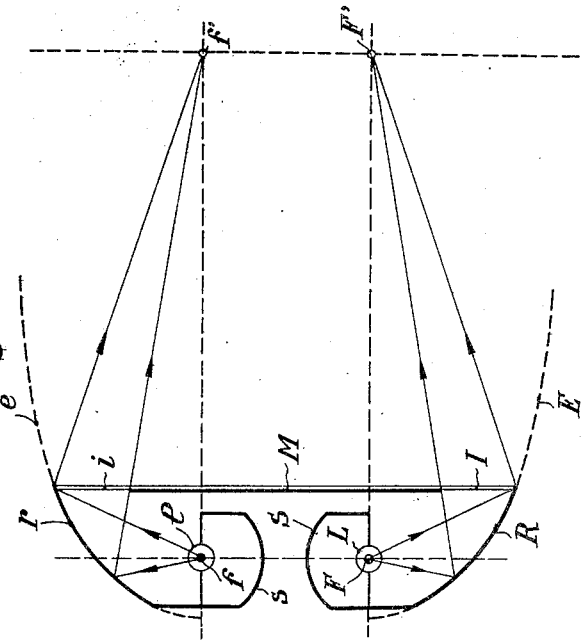
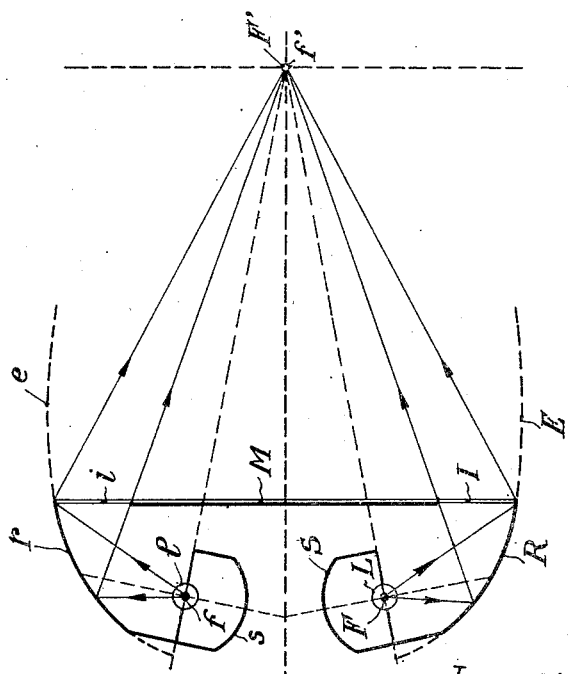
Inventor
Philippe Charles Duval
By Robert E Burns
Attorney Patented Sept. 15, 1953

2,652,480

UNITED STATES PATENT OFFICE 2,652,480

COMBINED ILLUMINATOR AND REFLECTOR

Philippe Charles Duval, Paris, France

Application June 17, 1948, Serial No. 33,587
In France July 21, 1947

2 Claims. (Cl. 240—4.2)

The present invention relates to a combined apparatus comprising a mirror and a light source the purpose of which is to illuminate the object to be looked at in the mirror.

The apparatus is so designed that no shadow will be produced on the object examined by the bodies present between the latter and the mirror and that the light source is concealed to the observer.

More specifically, the apparatus is composed of a plane or concave or convex mirror (depending on whether a full-size, enlarged or reduced image is desired) and of an illuminating device that consists of one or several light sources (not directly visible by the observer) and one or several continuous or discontinuous reflecting surfaces designed to direct the light flux from the source or sources while condensing or dispersing it in accordance with any predetermined law towards the object of the image of which is to be observed ultimately in the mirror.

How the invention may be carried into effect will now be explained hereinafter, reference being had to the appended drawings in which:

Figure 1 is a front elevational view of a device according to the invention, the hatched area representing that portion of the mirror which is silvered.

Figure 2 is a vertical section of the same apparatus taken on line II—II in Fig. 1.

Figure 3 is a horizontal section of the same apparatus taken on line III—III in Fig. 1.

Figure 4 is a front view of a modification suitable for odontotherapeutical purposes, the hatched area representing the silvered portion of the mirror.

Figs. 5 and 6 are views similar to Fig. 2, but illustrate the use of more than one light source.

The apparatus illustrated in Figs. 1 to 3 comprises a plane mirror M, or a slightly curved one as stated hereinbefore, in which the image of the object looked at is observed, for instance one's face, and a light source, for instance a glow-lamp L concealed by the mirror M and located at one of the focuses F of a portion of a reflecting surface R taken from an ellipsoid of revolution E. A slit I (or a transparent portion) is provided between the edge of the mirror M and that of the reflecting surface R as a passage for the illuminating light rays emanated from the source S and reflected by said surface R.

Located at the other focus F' of the ellipsoid E, or more properly in its focal plane, is the object to be observed, which consequently is perfectly well illuminated, no dazzling effect being experienced while no shadow or substantial dimming can be caused by the presence of any hand or other body between the mirror and one's face.

By considering Fig. 2 it will be appreciated that with one's eye located at O one's visual field will extend from P to Q.

As illustrated in Figs. 2 and 3 the apparatus may be complemented with a spherical mirror S having its centre at F and intended to collect a portion of the light flux from the source which otherwise would be lost.

The apparatus thus described is suitable notably as a shave mirror.

It may be variously designed, e. g. as a standard contingently housed apparatus for home installations, to be connected with a network, or a portable travelling apparatus to be fed with current as desired from a network of from a dry battery.

Larger size apparatus of the kind thus described may advantageously be used instead of the ordinary dressing-room looking-glasses employed up to the present.

Face-painting is greatly facilitated due to the absence of shadows. This kind of mirror may also be useful in the equipment of hair-dresser's shops, in which case it may be complemented with means to adjust the apparatus vertically and angularly.

Still larger-size apparatus may be used as phyche-glasses in the equipment of dress-maker's trying rooms or even for private use.

It may also be used as a shop-window mirror for the display of articles such as silk goods, flowers and the like which can thus be well set off by a combination of reflected and condensed light.

Of course, many other applications are possible.

Fig. 4 shows, for example, a very small-size apparatus that may advantageously be used by dentists or surgeons or even for endoscopic purposes instead of the conventional mirrors in which no illuminating means are provided. In the shown device, the mirror M is circular; the reflecting surface R has a circular perimeter; a small lamp L is located between mirror M and reflector R, at the focus of the ellipsoid of revolution of which R constitutes a portion. Said mirror M, reflector R and lamp L are mounted on a hollow handle T in which the leads U, V of the lamp L are arranged.

The advantage with such an apparatus is that it contains its own light source L and that consequently the cavity to be examined can be illuminated without the aid of any separate illuminating device and observed in the mirror M. For endoscopic purposes the advantage resides in that shadows are largely eliminated and dazzling is obviated since the light source is concealed to the observer's eye. The whole device is mounted on a handle T which the operator holds in his hand and in which the leads through which the small lamp L is fed with current are accommodated.

Of course, the embodiment just described is given only by way of exemplification and may be modified notably by the substitution of technically equivalent members without thereby departing from the scope of the invention.

For instance, instead of designing the apparatus as shown in Fig. 2, it may also be constructed as the result of the revolution about the axis FF' of only that portion which is located below the said axis, which in fact leads just to the small-size design illustrated in Fig. 4.

Likewise, besides the light source L located in the bottom of the apparatus and provided with a reflector R and a slit I, there may be used one or several other light sources, e. g. as represented in Fig. 5, a source $l$ located in the upper portion of the mirror M and associated with a portion $r$ of an ellipsoid $e$ to be so arranged that with the lamp $l$ located at one of its focuses $f$, the other focus $f'$ will coincide with the focus F' of the ellipsoid E comprising the reflecting portion R of the other source L. The light reflected on the reflector $r$ passes through a slit $i$.

Instead of being respectively located in the bottom and at the top of the apparatus, the light sources L and $l$ may be located one on the right and the other on the left of the apparatus.

Rather than arranging the focuses F' and $f'$ of the reflectors in coincidence as already stated they may be offset, which for instance in the case of a shaving mirror will enable to concentrate the light upon one's cheeks.

It remains obviously within the scope of the invention, while using linear or spatial sources (e. g. fluorescent tubes) to provide a mirror associated with one or several such sources concealed to the observer's eye and of which the light flux would be distributed over the object the image of which is examined in the mirror with the aid of suitable reflecting surfaces (portions of cylindrical, toric or conical surfaces having for their directrices a portion of an ellipse or any continuous or discontinuous curve that might be designed for the purpose in view).

What I claim as my invention and desire to secure by Letters Patent is:

1. A combined illuminator and mirror comprising a light source, a mirror element placed between said light source and the eye of the user when the user looks into said mirror element with its reflecting face turned toward the user and away from said light source, thus concealing said light source from the user, reflecting surfaces behind the light source, said reflecting surfaces being portions of ellipsoids of revolution having a focus at the light source and at a point forwardly of the reflecting face of said mirror element and below the eye of the user, and shield means defining open areas at the periphery of the lower portion of said mirror element for the free passage of the rays from said light source to said last-named focus.

2. A combined illuminator and mirror comprising a mirror element having a forward reflecting face, a light source disposed behind the back of the mirror, reflecting surfaces at the side of the light source, and a zone defined by shield means at the periphery of the lower portion of the mirror permitting the free passage of luminous rays from the light source, said reflecting surfaces being portions of ellipsoids of revolution having one focus at the light source and the other focus in front of said mirror element.

PHILIPPE CHARLES DUVAL.

References Cited in the file of this patent

UNITED STATES PATENTS

| Number | Name | Date |
|---|---|---|
| 299,277 | Sheridan | May 27, 1884 |
| 1,138,552 | Goddard | May 4, 1915 |
| 1,286,287 | Glenn | Dec. 3, 1918 |
| 1,533,605 | Pelton et al. | Apr. 14, 1925 |
| 1,667,545 | Goddard | Apr. 24, 1928 |
| 1,844,050 | Wesley | Feb. 9, 1932 |
| 1,850,219 | Walther | Mar. 22, 1932 |
| 2,180,151 | Koeller | Nov. 14, 1939 |
| 2,469,412 | Roebkin | May 10, 1949 |

FOREIGN PATENTS

| Number | Country | Date |
|---|---|---|
| 652,345 | France | Oct. 22, 1928 |
| 720,138 | France | Dec. 3, 1931 |
| 359,778 | Italy | June 6, 1938 |